(12) United States Patent
Weldemariam et al.

(10) Patent No.: US 12,008,503 B2
(45) Date of Patent: Jun. 11, 2024

(54) SENSOR RISK ASSESSMENT DATABASE

(71) Applicant: International Business Machines Corporation, Armonk, NY (US)

(72) Inventors: Komminist Weldemariam, Nairobi (KE); James R. Kozloski, New Fairfield, CT (US); Clifford A. Pickover, Yorktown Heights, NY (US); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 16/183,222

(22) Filed: Nov. 7, 2018

(65) Prior Publication Data

US 2020/0143300 A1   May 7, 2020

(51) Int. Cl.
| | | |
|---|---|---|
| *G06Q 10/0635* | (2023.01) | |
| *G06F 9/54* | (2006.01) | |
| *G06F 16/18* | (2019.01) | |
| *G06F 21/57* | (2013.01) | |
| *G06N 20/20* | (2019.01) | |
| *H04L 9/06* | (2006.01) | |
| *H04L 9/32* | (2006.01) | |

(52) U.S. Cl.
CPC ......... *G06Q 10/0635* (2013.01); *G06F 9/542* (2013.01); *G06F 16/1805* (2019.01); *G06F 21/572* (2013.01); *G06N 20/20* (2019.01); *H04L 9/0637* (2013.01); *H04L 9/3236* (2013.01)

(58) Field of Classification Search
CPC ............... G06Q 10/0635; G06N 20/20; G06F 16/1805; G06F 9/542; G06F 21/572; H04L 9/0637; H04L 9/3236

USPC .......................................................... 707/603
See application file for complete search history.

(56) References Cited

U.S. PATENT DOCUMENTS

| | | | |
|---|---|---|---|
| 2013/0073093 A1 | 3/2013 | Songkakul | |
| 2017/0006135 A1* | 1/2017 | Siebel | H04L 69/40 |
| 2017/0243028 A1* | 8/2017 | LaFever | G06F 21/6263 |
| 2018/0211115 A1* | 7/2018 | Klein | G08B 29/188 |
| 2018/0264347 A1* | 9/2018 | Tran | G06F 3/00 |
| 2018/0284757 A1* | 10/2018 | Cella | H04L 1/18 |
| 2018/0285996 A1* | 10/2018 | Ma | H04L 9/12 |
| 2018/0293573 A1* | 10/2018 | Ortiz | G06Q 20/023 |
| 2018/0293864 A1* | 10/2018 | Wedig | G08B 25/08 |

(Continued)

OTHER PUBLICATIONS

Black's Law Dictionary definition of exposure.*

(Continued)

*Primary Examiner* — Hosain T Alam
*Assistant Examiner* — Nicholas E Allen

(57) ABSTRACT

An example operation may include one or more of receiving sensor data from one or more sensors associated with a building, storing a block including the sensor data to a shared ledger of a blockchain network, the one or more sensors associated with one or more buildings, requesting a risk assessment for the sensor data, by a blockchain node, calculating the risk assessment with one or more machine learning algorithms based on the sensor data, historical sensor blockchain data, importance of the one or more sensors, and a degree of concern related to the sensor data, providing the risk assessment to the blockchain node, and generating an alert in response to the risk assessment above a threshold.

20 Claims, 14 Drawing Sheets

(56) References Cited

U.S. PATENT DOCUMENTS

| | | | |
|---|---|---|---|
| 2018/0299852 A1* | 10/2018 | Orsini | G05B 19/042 |
| 2018/0300829 A1* | 10/2018 | Crabtree | G06Q 10/0637 |
| 2018/0307859 A1* | 10/2018 | LaFever | G16H 10/60 |
| 2018/0315055 A1* | 11/2018 | Pickover | G06F 21/6245 |
| 2018/0315141 A1* | 11/2018 | Hunn | G06F 40/42 |

OTHER PUBLICATIONS

Wikipedia, Building automation, May 13, 2018.
Wikipedia, Indoor air quality, Nov. 6, 2018.
Wikipedia, Scada, Nov. 1, 2018.

\* cited by examiner

640

SENSOR RISK ASSESSMENT DATABASE

TECHNICAL FIELD

This application generally relates to a database storage system, and more particularly, to a sensor risk assessment database.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by lacking distributed access to shared ledger containing validated blockchain transactions of building sensor-related events, actions, and maintenance activities. As such, what is needed is a solution to overcome these significant drawbacks.

SUMMARY

One example embodiment provides a system that includes a blockchain network, the blockchain network including a first, a second, and a third blockchain node. The first blockchain node is configured to receive sensor data from one or more sensors associated with a building and create a blockchain transaction including the sensor data. The blockchain transaction is configured to store the sensor data to a shared ledger of the blockchain network. The second blockchain node is configured to request a risk assessment based on the sensor data. The third blockchain node is configured to calculate the risk assessment with one or more machine learning algorithms based on the sensor data, historical sensor blockchain data, importance of the one or more sensors, and a degree of concern related to the sensor data, provide the risk assessment to the second blockchain node, and generate an alert in response to the risk assessment above a threshold.

Another example embodiment provides a method that includes one or more of receiving sensor data from one or more sensors associated with a building, storing a block including the sensor data to a shared ledger of a blockchain network, the one or more sensors associated with one or more buildings requesting a risk assessment for the sensor data, by a blockchain node, calculating the risk assessment with one or more machine learning algorithms based on the sensor data, historical sensor blockchain data, importance of the one or more sensors, and a degree of concern related to the sensor data, providing the risk assessment to the blockchain node, and generating an alert in response to the risk assessment above a threshold.

A further example embodiment provides a non-transitory computer readable medium including instructions, that when read by a processor, cause the processor to perform one or more of receiving sensor data from one or more sensors associated with a building, storing a block including the sensor data to a shared ledger of a blockchain network, the one or more sensors associated with one or more buildings, requesting a risk assessment for the sensor data, by a blockchain node, calculating the risk assessment with one or more machine learning algorithms based on the sensor data, historical sensor blockchain data, importance of the one or more sensors, and a degree of concern related to the sensor data, providing the risk assessment to the blockchain node, and generating an alert in response to the risk assessment above a threshold.

DETAILED DESCRIPTION

Figure 1:
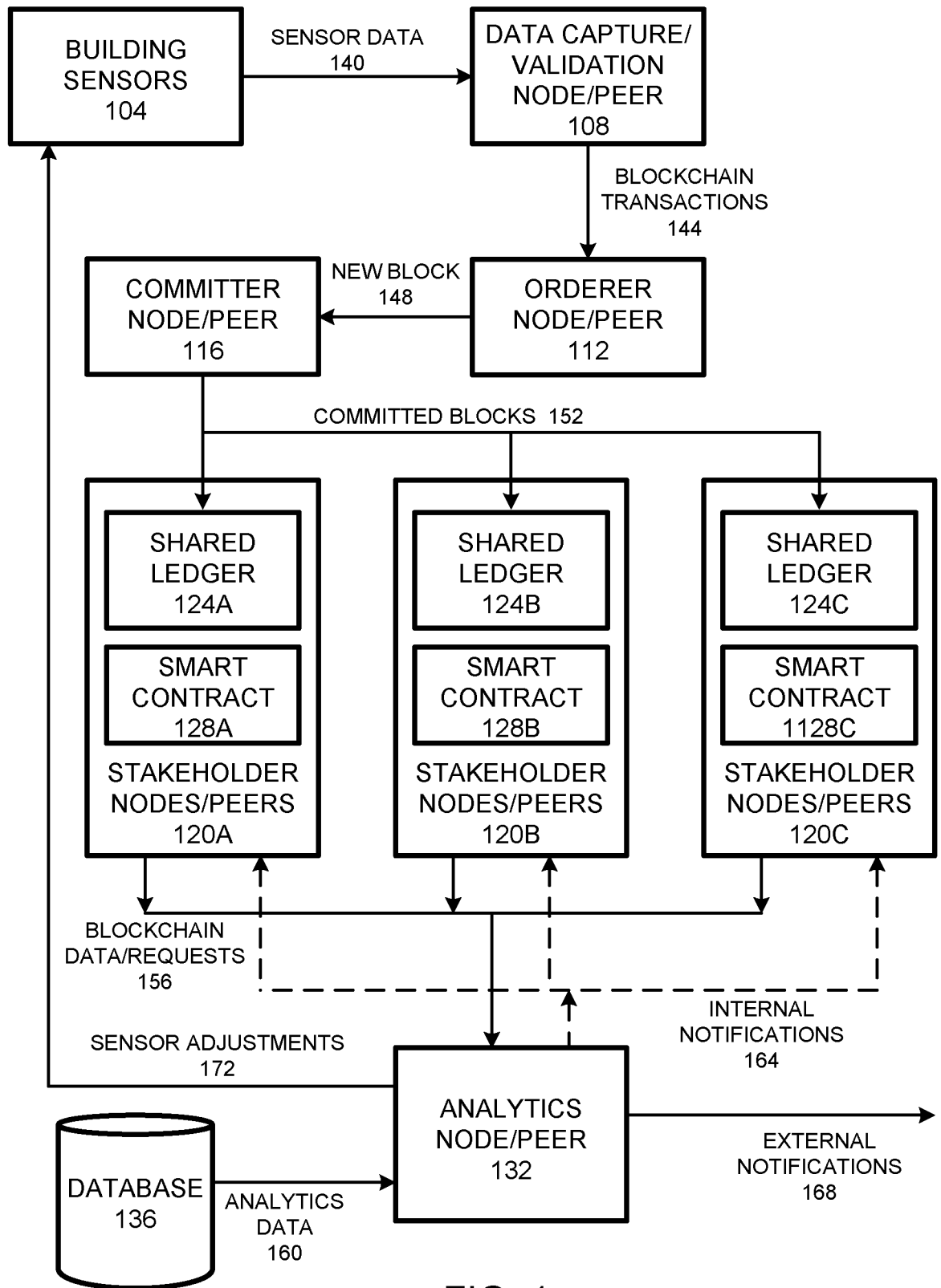
FIG. 1 illustrates a network diagram of a building sensor management system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Building sensors play a significant role in today's technology-based society. One of the challenges to smart building adoption is related to the granularity, quality, and quantity of the sensed data. In one example, such systems are used to manage, maintain, track, and resolve concerns associated with buildings (including sensors related to energy, safety, door openings, etc.). Sensor transactions associated with a building may be compiled into a chain of building sensor transaction blocks. The chain can be considered a chronicle of a building's (or sensor's) path through time. When a sensor transaction is conducted (e.g., a sensor concern is made apparent or responded to), the corresponding issue parameters are sent to one or more validation components. The components establish a validity of the transaction and generate a new block. Once the new block has been calculated it can be appended to a stakeholder's historic building blockchain. Various aspects of building sensors may be tracked such as: air quality, door openings, temperature, etc. The system may also track a possible risk assessment (a multidimensional vector, with several dimensions of risk, R), for example, related to importance of sensor readings.

Sogeti High Tech's technology is an innovative and versatile generic engine created to manage and process sensor data, services, and events. It includes a two-layer plug-in architecture that enables it to connect to heterogeneous sensors. The first or bottom layer allows sensors and actuators to connect and send their data using various protocols: USB, Bluetooth, ZigBee, or 6LoWPAN. The second or upper layer allows translation of the data and forwards it to other services/applications using email, SMS, MQTT, etc.

IBM's Internet of Things service provides an answer to the second challenge. The IoT service provides an easy way to register any device or gateway and get them connected using the standard MQTT protocol. This allows low bandwidth bi-directional communication. All the data sent to the IoT service is also automatically saved to a historian service. A variety of sensors are connected to each gateway, for example: ZigBee door sensors and motion detectors, ENOCEAN switches, ZWAVE power plugs, USB card readers, a webcam, and various onboard sensors (temperature, humidity, passive infrared, etc.). Automatic opening and closing of door by sensing any body movement near the door can be achieved with the help of a PIR (Passive Infrared) sensor.

IBM's Internet of Things service can be applied to many industries: smart factory, smart agriculture, water management, etc. Different rooms or floors may be instrumented. A variety of sensors may be connected to each gateway. IBM's Internet of Things service is able to understand each protocol and data format. The data is then transformed into a JSON format to be used with IBM's IoT service. IBM's Internet of Things service is also able to advertise what services are available on the different devices using a specific JSON format. This is important as this enables these services to be available to the remote operators. Data and events are forwarded as they occur by each gateway to IBM's IoT Cloud by sending JSON over the MQTT Protocol. An application processes incoming messages based on a flow that can be configured separately per room. Some of the data is captured and stored in the historian. Some of the data is consumed by the live user interface. Some of the data can trigger alerts. For instance if a room is secure, any opening of the door without an appropriate badge in the badge reader will trigger an alert. Thanks to the services being advertised by the gateway and the bi-directional aspect of the MQTT connection, the flow can also trigger, for instance, automatically recording a video stream.

The platform also hosts the web user interface of a demonstrator running on a node. The user interface (UI) displays real-time information about each of the buildings connected. The operator also has the ability to send commands to services advertised in a room. For instance, a light switch can be remotely turned on/off. In addition, the platform also makes a wide variety of other services available for composing more advanced flows: Use of geolocation, mobile push, SMS, etc. In conclusion, by leveraging IBM's IoT service, Sogeti High Tech is able to offer vertical solutions for various industries. Using these vertical solutions, customers will be able to take full advantage of this new world with omnipresent connectable sensors.

Building automation is the automatic centralized control of a building's heating, ventilation and air conditioning, lighting, and other systems through a building management system or building automation system (BAS). The objectives of building automation are improved occupant comfort, efficient operation of building systems, reduction in energy consumption and operating costs, and improved life cycle of utilities. Sensor readings are critical to the operations of buildings. The present application describes the use of blockchain technology in building and sensor tracking systems. In short, blockchain technology tracks building sensors in a novel way, with positive implications for safety, energy, security, the environment, etc.

Example embodiments provide methods, systems, components, non-transitory computer readable media, devices, and/or networks, which provide a sensor risk analysis database.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure interactions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes". In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log; it can therefore be regenerated from the chain at any time. The state database may automatically be recovered (or generated if needed) upon peer node startup, and before transactions are accepted.

Some benefits of the instant solutions described and depicted herein include improved safety, energy, security, environment of building management. Buildings may be managed via varieties of sensors by establishing digital trust among connected sensors to track and manage building operations via smart contracts and blockchain technology.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the improved safety, energy, security, and environment of building management is implemented due to immutability/accountability characteristics, smart contracts, improved security, decentralized/distributed characteristics, blockchain consensus, endorsement, and accessibility, which are inherent and unique to blockchain technology.

In particular, with respect to immutability/accountability, the present application helps by creating a permanent and unbreakable link between a building ID, sensor ID, service record related to a sensor, a problem (e.g., sensor software, hardware, connectivity, or service), and one or more sensors. That link—the record of "ownership"—can be forever verified and tracked. With respect to smart contracts, the present application makes use of custom designed smart contracts to register/onboard sensors, buildings, etc. track and store (on-chain) the sensor uses, readings, and operations according to risk assessment. Smart contracts are also used to facilitate query to chain data and access control rights.

With respect to security, security from adversaries against the sensors, computation, storage, and hence against buildings implies that the stored transactional and operational data once validated can be trusted at any later point in time by cross referencing the blockchain. This, together with smart contracts, allows blockchain networks to establish digital trust among participants (both human and non-human entities) in building operations. The present application tracks various risk vectors (e.g., through sensor malfunctions for different classes of sensors, sensor software viruses, use of sensors without appropriate electrical or security support, etc.). The security properties added to the block may be multidimensional in nature and involve various types of risk for stakeholders (e.g., building occupants, city, building owners, patients, etc.).

With respect to decentralized/distributed aspects, every stakeholder involved in building management may run a node/peer in a decentralized manner such that each has a copy of the blockchain transactions in a shared ledger. The entire process of collecting, validating, computing, storing, and managing of the tracked readings from each sensor is decentralized. The blockchain network also creates a single point of truth that can easily mitigate a central point of attack to corrupt building management.

With respect to consensus, transaction validations carried by the nodes/peers are critical to establish digital trust among participants as it is essential that at least a sufficient fraction of peers accept the computations as being correct. The chosen consensus mechanism will also ensure that the blockchain transactions and data pertaining building operations and management stored on the shared ledger are up-to-date across the nodes/peers.

With respect to endorsement, permissioned blockchain networks such as Hyperledger Fabric allows each step in the computation to be endorsed by independent endorsers in the blockchain network to establish the digital trust as noted previously.

Finally, with respect to accessibility, accessibility may be easily achieved (i) via the distributed nature of the shared ledger, (ii) the shared ledger is shared among all participating nodes/peers, (iii) any node/peer who wishes to access the results of the stored building operations data may run analytics services, using one or more configured machine learning models or algorithms, by reverse correlating the blocks in an iterative fashion.

One of the benefits of the example embodiments is that it improves the functionality of a computing system by improving access to important sensor data. Building sensor and problem tracking transactions associated with a stakeholder are compiled into a chain of sensor data transaction blocks. The chain can be considered a chronicle of a building and/or sensor's path through time. When a transaction is conducted (e.g., a sensor issue is made apparent or responded to), the corresponding sensor issue parameters are sent to one or more validation components to guarantee, at least with a high confidence level, that the source is a trusted sensor and the data format is correct. The components establish a validity of transactions and generate a new block. Once the new block has been created, it can be appended to the stakeholder's inventory blockchain. Various aspects of the sensor issue or information can be tracked such as: building ID, sensor ID, number of occupants, sensor manufacturer, sensor software vendor, location of a sensor, purpose of a sensor, distribution of similar sensors within a radius, usage, etc. The system tracks a possible risk assessment, which is a multidimensional vector with several dimensions of risk, R (e.g., importance of sensor, degree of concern with a sensor reading, use of building at a particular time, etc.) The rate of appending to the block may change based on criteria mentioned herein.

Through the blockchain system described in the present application, a computing system can perform storing of critical data in a decentralized manner, associating risk analysis based on sensor and historical data, and automatically assign issues and maintenance to responsible personnel because of blockchain technology.

The example embodiments provide numerous benefits over a traditional database. For example, through the blockchain the embodiments provide improved management for inter-connected buildings via a variety of sensors by establishing digital trust among connected sensors to track and manage building operations via smart contracts and blockchain technology.

Meanwhile, a traditional database could not be used to implement the example embodiments because of three primary issues: i) They do not instrument, track and store fine-granular sensory data in a decentralized/distributed manner while establishing a digital and verifiable trust among stakeholders involved in an end-to-end building management and visibility environment. (ii) The methods of storing and managing data on shared ledgers are not driven by determined risk (using advanced analytics) to a building occupant or other stakeholder. (iii) Capabilities such as distribution and assignment of issues to maintenance persons in charge, statistical analysis of potentially problematic or concerning sensor readings, warranties for a sensor, automatic generation of alerts by alarming systems, e.g., sensor network monitoring, fulfillment of external service agreements (SLA), descriptions of the problem being experienced, attempted solutions or workarounds and other relevant information, maintaining a history of each change associated with sensors, building floors, and buildings etc. are not considered by currently database implementations. (iv) The currently existing database systems also rely on digital trust established by a human rather than smart contract-driven consensus and endorsement mechanisms. This enables a robust building sensor tracking solution to help in predictive maintenance, resolve warranty and liability issues, resolve false claims, assist with valuation tasks, resolve concerns about health, safety, and the environment, etc. by obtaining at least a portion of the historical sensor blockchain over a network. Accordingly, the example embodiments provide for a specific solution to a problem in the arts/field of building sensor management with risk analytics.

The example embodiments also change how data may be stored within a block structure of the blockchain. For example, sensor hardware and software information, building occupant information (e.g., building is empty vs. a large party with hundreds of people) that can be inferred from sensors (e.g., a motion sensor-based digital counting system installed at the gate of a building, a stream of video feed data from a surveillance camera, etc.), occupant cohorts (e.g., the types of occupants such as elderly, a nursing home, children, etc.) that can be inferred from one or more sensors (e.g., voice recognition using a stream of audio/video feed data), a level of service a customer has paid for (e.g., gold vs. silver support for monitoring and analysis of sensors), and problem resolution information (e.g., if a sensor problem or confusion was resolved) may be stored. With respect to issue information, the distribution and assignment of issues to maintenance persons in charge, statistical analysis of potentially problematic or concerning sensor readings, warranties for sensors, automatic generation of alerts by alarming systems (e.g., sensor network monitoring), fulfillment of external service agreements (SLA), descriptions of the problem being experienced, attempted solutions or workarounds and other relevant information, maintaining a history of each change associated with sensors, building floors, and buildings may be stored. With respect to transactional data, any tracked, sensed, instrumented or learned data from sensors and any other IoT-enabled systems/devices in connected buildings may be stored. Any of these data types may be stored within headers, data segments, or metadata of data blocks. Some of these data types may be stored on secure off-chain storage. Performance and computational overhead are bottlenecks for efficient operation of building management. However, a reference to each off-ledger data may be stored on-chain as a hash value and permission (i.e., access control) to access the off-chain data is controlled by smart contracts.

By storing sensor, issue, and transactional data within data blocks of a blockchain, the sensor, issue, and transactional data may be appended to an immutable ledger through a hash-linked chain of blocks. In some embodiments, the data block may be different than a traditional data block. Transaction data pertaining to sensors/building operations driven by risk assessment may be stored. When risk is deemed to be high, for example, due to a possibly dangerous condition, the rate of addition of sensor data to the block may be increased. This is useful for many reasons, including having a more precise/granular record of events stored in the block for later analysis and to help resolve issues and disputes concerting liability, safety, and learning from the past. The actual nature of data added to the block may change. For example, if a certain possibly dangerous condition exists, different kinds of sensors may be activated, or algorithms/software associated with the sensor tuned, and this new kind of data may be added to the block. Similarly, the frequency, or rate, of updating the block may be based on risk analysis or capacity (for example, a building is handling more than expected capacity such as a shopping mall near holidays), analysis of context (e.g., a large crowd in a night club), based on predicted energy consumption, detecting one or more faults in building systems, a detected critical sensor malfunctioning, etc. Chaincodes for validating the accuracy of sensor readings based on sensor cohort from historic blocks as various heterogeneous sensors that may have different protocols and different data formats. Transactions may upload a repair history (e.g., paper document, invoice, etc.) of the building (e.g., repairing/replacing a faulty sensor). Customized analytics utilities may be used for localizing energy-consuming parts of the building, etc. Customized analytics utilities for generating events that may trigger further actions such as sending signals to switch energy-consuming sensors/sources, turning off some sensors based on in temperature quality, or triggering other transactions (e.g., automatically switching the recording of a video feed) may be used as well, In some sense, the method of updating historic building events in a blockchain may further be based on transactions related to contextual information based on comparison sensors reading from both inside and outside a building. For example, an air conditioning usage pattern may be tracked and compared against weather conditions to distinguish energy savings due to predicted favorable weather from an outside environment (i.e., a real improvement), or by obtaining historic events related to past air conditioning patterns of a building.

FIG. 1 illustrates a network diagram of a building sensor management system including a database, according to example embodiments. Referring to FIG. 1, the network 100 includes a building including one or more building sensors 104. The one or more sensors 104 produce sensor data 140 to a data capture/validation node or peer 108. The blockchain network 100 may be either a public or permissioned blockchain network, but in the preferred embodiment is a permissioned blockchain network such as Hyperledger Fabric.

Building sensors 104 may come in many forms. For example, monitoring chips may be attached to a building and may include a sensor 104, a microprocessor, a memory, a radio interface, an electric power controller, and an electric power generator. In one of many embodiments, a monitoring chip may intermittently receive power to intermittently monitor information such as whether concrete is adequately cured, monitor information about air temperature in a room, etc. Temperature sensors and other sensors built in the monitoring chip can use the built-in electric power generator as a power source or they may use an external source, and the system may transmit any abnormal values. Data may be transmitted according to an external request to indicate one or more building parameters.

Other sensors 104 may monitor moisture in a building. They may provide an output resistance value ranging from a dry value in the absence of moisture and different wet values in the presence of moisture depending on the quantity of moisture. Rather than sending a signal to a blockchain based solely on a moisture threshold, a risk assessment of potential damage can be calculated for at least a part of the building using the wet values from the moisture detectors for the sensor zones using as input data the wet values and as a first additional factor a value which is indicative of a total area of the moisture as provided by the number of sensor zones that are responding with a wet value and as a second additional value the number of consecutive time periods that the sensor zone has reported wet value. The calculation can use computer modeling to calculate a risk factor for growth of mold or a risk factor for growth of timber decay fungi.

Some sensors 104 may assist with controlling energy consumption in a building. This may also involve including receiving weather data along with building occupant information, including the prediction of occupant schedules, energy price data, etc. Sensor data 140 may also include any of: a record of complaints/issues, a registering of sensor 104 hardware or software, updating the status of issues about a sensor 104, storing the usage information regarding the sensor 104 and lifetime of a sensor 104, repair information, test results of sensors 104 (e.g., reliability assessment, recovery/backup information, compatibility tests), and revoking of reported issue/complaint associated with a sensor 104, etc.

The data capture or validation node or peer 108 validates the sensor data 140, and includes the validated sensor data in blockchain transactions 144 for the blockchain network 100. An orderer node or peer 112 accumulates blockchain transactions 144 based on criteria established by the blockchain network 100, and generates new blocks 148 to a committer node or peer 116. The committer node or peer 116 stores committed blocks 152, including validated sensor data 140, to shared ledgers 124 of the blockchain network 100.

A sensor transaction including one or more sensor tokens may represent sensor activities taken with respect to a sensor 104. Validation devices such as the data capture/validation node or peer 108 may obtain a historical block identifier from a sensor 104 or building complaint/issue historical blockchain representative of activities carried with respect to the issue associated with a sensor 104. The set of complaint (issue) tokens for a sensor 104 may include a token representative of at least one of the following: an issue/bug/defect behavior/effect, a status code, a resolution/analysis, a sensor identifier, a reporter identifier, a fixer identifier, a predicted impact, etc., or sensor and issue registration. Each sensor 104 (e.g., which may also include hardware or software) issue may be assigned a unique identifier (UDI) and the registration of a sensor 104 may be added to the blockchain shared ledger 124. Apart from recording the sensor UDI, if the sensor 104 has been in use prior to a date of registration, its history of use is captured and written as a transaction to the blockchain.

Alerts that may be automatically generated by existing building management systems (e.g., alarm systems, network monitoring systems, etc.) may initiate an update transaction which may trigger a chaincode update operation. Thus, a new block may be appended to the growing blockchain shared ledger 124. The disclosed system may also record on the blockchain any of sensor ID, location, type, and maintenance of sensors.

Data may be added to blocks that include data used in building automation, such as electronic devices designed to monitor and control the mechanical, security, fire and flood safety, lighting (especially emergency lighting), moisture, vermin detection, HVAC, humidity control, and ventilation systems in a building. The blocks may include sensor data 140 related to energy, air and water conservation characteristics, electrical device demand, and ventilation and humidity monitoring. Data may be added to the blocks include temperature, humidity and pressure sensor data, lighting, air handling, water, carbon monoxide, radon, fire, smoke, biological and chemical sensors (for example, to determine if ventilation systems have failed mechanically or become infected with contaminants that affect human health). Differential pressure switches may be placed in proximity to a filter to determine if it is dirty. Valve actuators may have end switches to indicate if the valve has opened or not. Security systems can be interlocked to a building automation system. Electrical fault detection systems can turn circuits off.

Indoor air quality (IAQ) may be monitored, which is affected by gases (carbon monoxide, radon, volatile organic compounds), particulates, microbial contaminants (mold, bacteria), and so forth. Determination of IAQ involves the collection of air samples, monitoring human exposure to pollutants, and collection of samples and even and analytical modeling of air flow inside buildings. Indoor air pollution in developing nations is a major health hazard. A major source of indoor air pollution in developing countries is the burning of biomass (e.g., wood, charcoal, dung, or crop residue) for heating and cooking.

The disclosed system may also track a possible risk assessment, which includes a multidimensional vector with several dimensions of risk, R. The risk value need not be a scalar quantity but may take into account various dimensions of risk and problem spread (e.g., through sensor malfunctions for different classes of sensors 104, sensor software viruses, use of sensors 104 without appropriate electrical or security support, etc). In other words, risk parameters added to the block may be multidimensional in nature and involve various types of risks for stakeholders (e.g., building occupant, city, building owner, patient, etc.).

A cognitive context may change the rate and content of block addition. For example, sometimes a building occupant may be judged to be highly anxious based on analysis of the analysis of speech in a phone call or wording of a complaint or bug report. If building occupant or maintenance person is excited, scared, or angry, the block may be written to more often (e.g., even before a full sensor 104 incident report is completed, but only half of it is completed). When a sensor 104 is deemed particularly critical or a bug is particularly critical, content may be tracked more finely and/or more often. Also, the reputation of a building owner or other party may be at stake. Thus, content that is added to a block may also be changed.

When risk is deemed to be high, for example, due to a possibly dangerous condition, the rate of addition of sensor data 140 to the block 148 may be increased. This is useful for many reasons, including having a more precise/granular record of events stored in the block 148 for later analysis and to help resolve issues and disputes concerting liability, safety, and learning from the past. The actual nature of data added to the block 148 may change. For example, if a certain possibly dangerous condition exists, which can be inferred based on the analysis of the data using one or more machine learning models trained on historical blockchain data and/or off-chain data, different kinds of sensors 140 may be activated or algorithms/software associated with the sensor 140 tuned, and this new kind of data may be added to the block 148.

Similarly, the frequency or rate of updating the block 148 may be based on risk analysis, which may conclude a building is handling more than expected capacity (e.g., a mall is more visited on Christmas eve), analysis of context (e.g., a crowded night club), based on predicted energy consumption, detecting fault in building systems, detected critical sensor malfunctioning, etc.

Chaincodes for validating the accuracy of sensors 104, readings based on sensor cohort from historic blocks (as various heterogeneous sensors 140 that may come with different protocols and different data formats). Transactions 144 may include an uploaded repair history (e.g., paper document, invoice, etc) of the building (e.g., repairing/replacing faulty sensor). Customized analytics utilities may be used for localizing the most energy-consuming parts of a building, etc. Customized analytics utilities may be used for generating events that may trigger further actions such as sending signals to switch energy-consuming sensors/sources, turning off some sensors based on in temperature quality, or triggering other transactions (e.g., automatically switching the recording of a video feed). In some sense, updating a historic building's events blockchain may further be based on transactions 144 related to contextual information based on comparing sensor 104 readings from both inside and outside a building. For example, an air conditioning usage pattern may be tracked and compared against weather conditions to distinguish energy savings due to predicted favorable weather from the outside environment by obtaining historic events related to past air conditionings patterns of the building.

This presently disclosed system, or variant thereof, may be used for detecting/tracking the sentiment of building maintenance personable, security staff, or building occupants (e.g., excited, angry, weak), and may be based on the description of the issue or concern reported, by applying text analytics (such as using IBM's Alchemy services or IBM's Tone analyzer that uses linguistic analysis to detect and interpret emotions, social tendencies, and language style cues found in text, etc). This capability may be part of a workflow engine of the chaincodes used by all validating nodes in the blockchain network 100.

In an additional embodiment, the present application may apply cohort analysis of reporters who are concerned with sensors 104, whether they be human or electronic (e.g., different levels of training and knowledge about the sensor system being discussed, different types of electronic feedback) by obtaining a profile of a human reporter or on an electronic reporter, and obtaining a historic block identifier from a complaint/issue historical blockchain. Cohort analysis may include analysis of the user profile (e.g., levels of training and knowledge about the sensor system being used, different kinds of electronic feedback/interactions). The cohort refers to similarity analysis among different users— i.e. what is in common between them.

For detecting and verifying the validity of deduplication, the system of the present application may utilize prior art by analyzing user cohort and context information. One building may request another building to provide help, for example, help in interpreting and reacting to certain sensor data 140. To accomplish this, a service that helps operate a building sensor blockchain may detect a need to access another building's blockchain to gain insight, and this may be performed, of course, with proper permissions and security, with the permission list specified and controlled using access control chaincode. Optionally, information may be added to a block when a building occupant or maintenance person or electronic agent files a bug report, but also optionally, information may be added more often when extremely relevant bug reports are in the news, discussion boards, etc. Also, a severity of a sensor feature bug, priority of a bug, aspect such as tracking the connection between priority and severity, tracking and managing sensor software vulnerabilities and bugs may be recorded.

Associated with the building are one or more stakeholder nodes or peers 120, shown as stakeholder node or peer 120A, stakeholder node or peer 120B, and stakeholder node or peer 120C. There may be any number of stakeholder nodes or peers 120 in blockchain network 100. Stakeholder node or peer 120A includes shared ledger 124A and smart contract or chaincode 128A. Stakeholder node or peer 120B includes shared ledger 124B and smart contract or chaincode 128B. Stakeholder node or peer 120C includes shared ledger 124C and smart contract or chaincode 128C.

For many potential reasons, stakeholder nodes or peers 120 generates blockchain data requests 156 to an analytics node or peer 132. In one embodiment, the blockchain data requests 156 include one or more blockchain transactions. In one embodiment, the blockchain data requests 156 include one or more risk assessment requests related to the building sensors 104.

Upon receiving the blockchain data requests 156, the analytics node or peer 132 obtains sensor-related information from the shared ledgers 124 and analytics data 160 from a risk analysis database 136. With this sensor-related information, the analytics node or peer 132 calculates a requested risk assessment. In one embodiment, the analytics node or peer 132 provides the risk assessment as an internal notification 164 to the stakeholder node or peer 120 that requested the risk assessment or to all stakeholder nodes or peers 120. In one embodiment, the analytics node or peer 132 provides the risk assessment as an external notification 168 to a user device outside the blockchain network 100. In one embodiment, the user device corresponds to a stakeholder node or peer 120 that requested the risk assessment or to all stakeholder nodes or peers 120. In some embodiments, the analytics node or peer 132 provides sensor adjustments 172 to building sensors 104, as shown. In other embodiments, the analytics node or peer 132 provides sensor adjustments 172 to the data capture/validation node or peer 108, which in turn may provide sensor adjustments 172 to building sensors 104.

Although endorser nodes are not explicitly shown in FIG. 1 for clarity, it should be understood that one or more endorser nodes are present in blockchain network 100 to endorse all blockchain transactions 144 in order to establish trust in the sensory data validation processes described herein.

Systems and methods of the present application may facilitate various customized services applications and services, including but not limited to fault detection and diagnosis service (enabling timely and targeted interventions in cases of faulty or malfunctioning building sensors 104), alarm management services (enabling prioritization of alarms or notifications generated by building systems by validating the alarms), energy management services (enabling the tracking and optimization of building energy consumption and performance over time by obtaining historic events from the blockchain networks), and maintenance services (enabling any stakeholders involved with predictive maintenance, liability, warranties, root-cause determination, and resolution of disputes). It can also be used to provide information for managing lessons learned by obtaining various historic events from the building blockchain.

Finally, the disclosed blockchain-implemented system may be used to facilitate lock-in attribution. The system can help create a permanent and unbreakable link between a building ID, a sensor ID, and a service record related to a sensor 104 and a problem (e.g., sensor software, hardware, connectivity, or service). That link or the record of ownership may be forever verified and tracked. The disclosed blockchain-implemented system may also be used to gain visibility by tracing where and how a sensor concern and complaint spreads. The system may show all the locations and sensors/complaints or similar sensors/complaints that have occurred and associated movement over time.

In other embodiments, sensors 104 may involve aspects of a building construction process, if a definition of conventional sensors 104 is expanded. Private information about the construction of a building may be stored in a blockchain. This data may be collected from body cameras (a form of sensor 104) on construction workers or contractors, surveillance footage of offsite manufacturing processes (using sensors 104), delivery data, time cards of foremen (in which time card readers are the sensors 104), etc., —each of which may not be considered freely sharable among the parties involved. Instead, by accumulating a building-specific blockchain pertinent to the entire construction process, the present application allows for retrospective accessing of one or more blocks to assess and investigate reasons for a failure of the building.

In cases of building failures, the problem of corruption and shoddy construction and materials may not be detected until a catastrophic failure event, such as in an earthquake. This related aspect of the present application attempts to increase the visibility into the construction process when such events occur, without subjecting the entire sector to increased regulation. The implementation of this solution allows a blockchain to constantly accumulate evidence that can be used at a later date if legal action is required. By maintaining the privacy of all parties, trade secrets around materials and manufacturing/construction methods may be maintained. Furthermore, the assessment of best practice of the engineers and architects involved in construction of a building can have a stronger influence on decisions made by investors and contractors since the recommendations may also be logged in the system. Finally, the incentive to make a building safe may be increased since the discoverability of flaws in the construction process are suddenly made visible upon triggering access to the blockchain. Every stage and contribution to construction of a major project may be added to the blockchain, and this may involve sensors 104.

Blockchain building sensor information may also include information on which vendor a discontinued sensor 104 belongs to, which product is discontinued, the reasoning for the discontinuing, etc. Information may also include number of errors needing fixing, from which vendor the errors came from, information on the sensor number (if relevant), what the problem is, the urgency fields, etc. The present application may also be used to generate a risk register (or risk log), such as a scatter plot used as a risk management tool and to fulfill regulatory compliance, act as a repository for all risks identified and including additional information about each risk (e.g., nature of the risk, reference and owner, or mitigation measures). In another embodiment, the system may generate alerts or notification signals which may further trigger a signal for controlling a physical system within a building. Such physical systems may be a combination of one or more of data collection sensors (e.g., with a possible issue/concern), ATM machine, or applications, etc. For example, if a risk R level suggests the probability of the reported issue may cause the sensor 104 to leak sensitive information, a signal may then shut down the operation of the sensor 104. Such physical systems include SCADA systems: Supervisory control and data acquisition (SCADA) is a system for remote monitoring and control that operates with coded signals over communication channels. It is a type of industrial control system (ICS) and can be used control vital machines and infrastructures. SCADA processes may often involve industrial processes include those of manufacturing, production, power generation, and fabrication. They may involve water treatment and distribution, wastewater collection and treatment, oil and gas pipelines, electrical power transmission and distribution, wind farms, civil defense siren systems, and large communication systems. They may monitor and control heating, ventilation, and air conditioning systems (HVAC), access, and energy consumption.

Figure 2A:
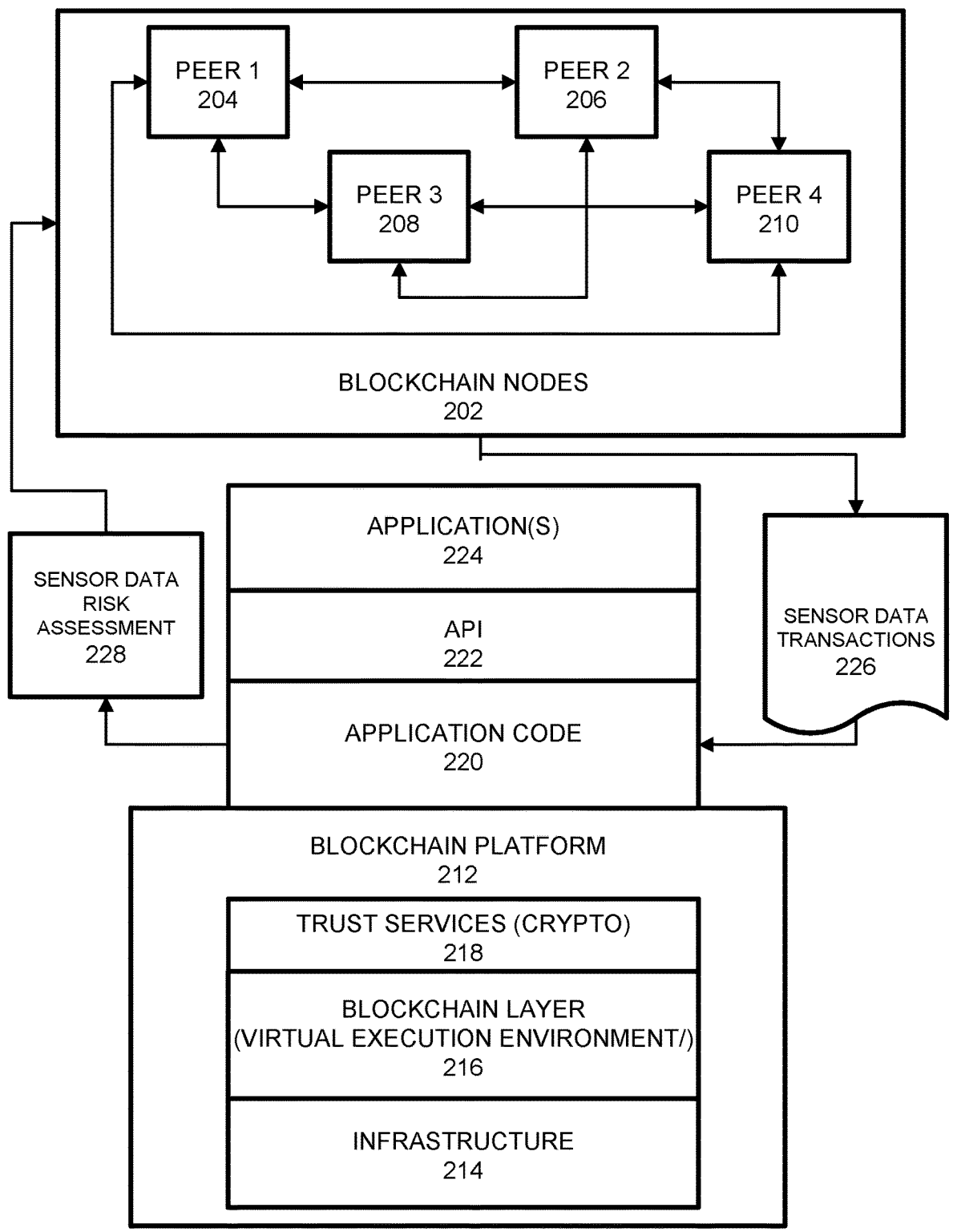
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include one or more sensor data transactions, which may be processed by one or more processing entities (e.g., virtual machines) included in the blockchain layer 216. The result 228 may include a sensor data risk assessment. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, one or more sensor data transactions 226 may be received. One function may be to calculate a sensor data risk assessment 228 based on sensor data in the shared ledger or from an analytics database associated with the blockchain network, which may be provided to one or more of the nodes 204-210.

Figure 2B:
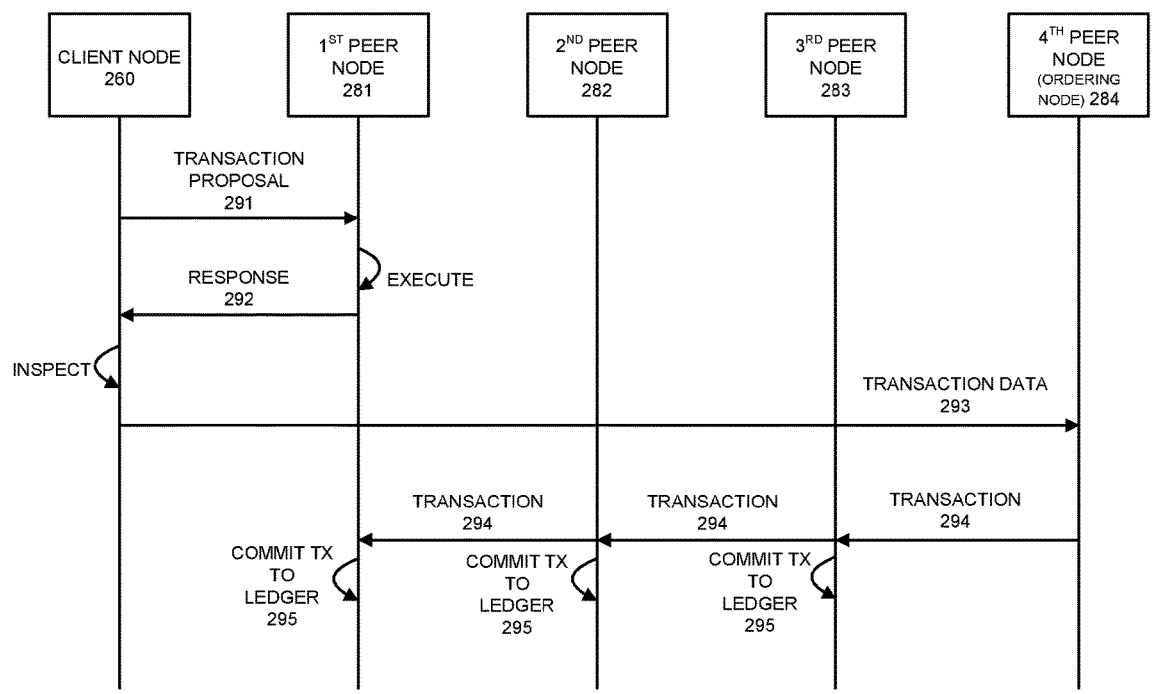
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
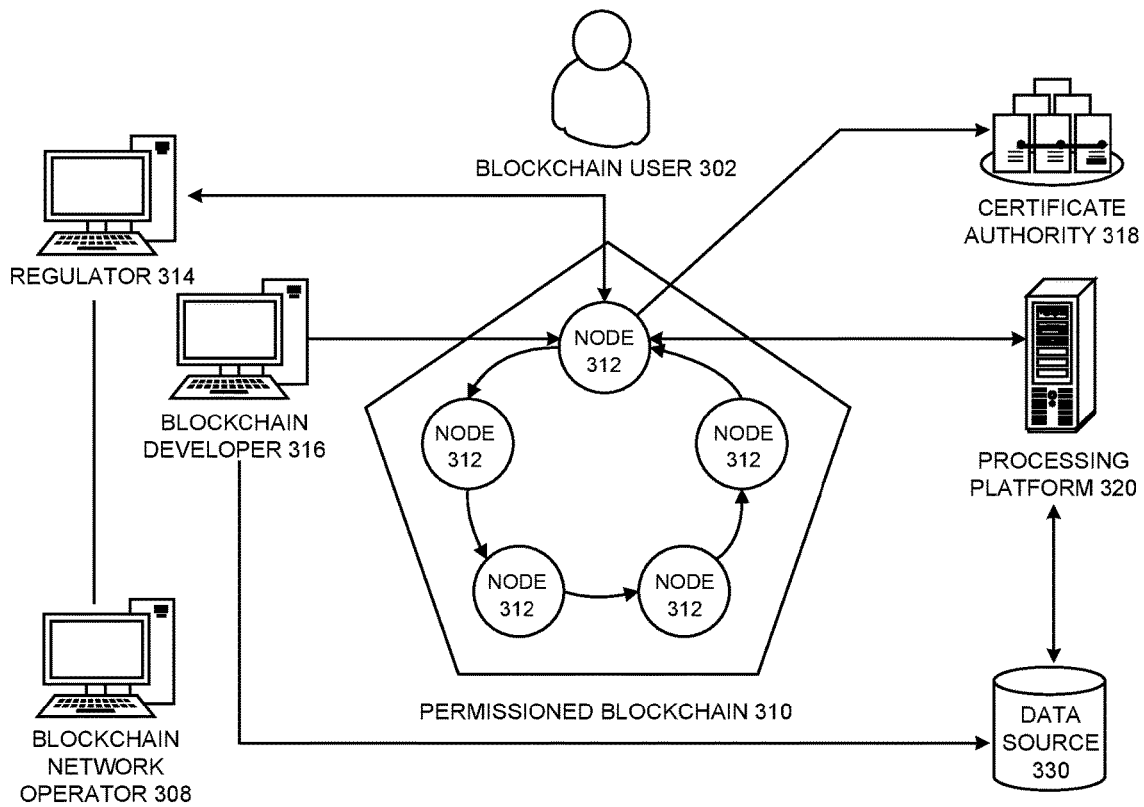
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger, whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
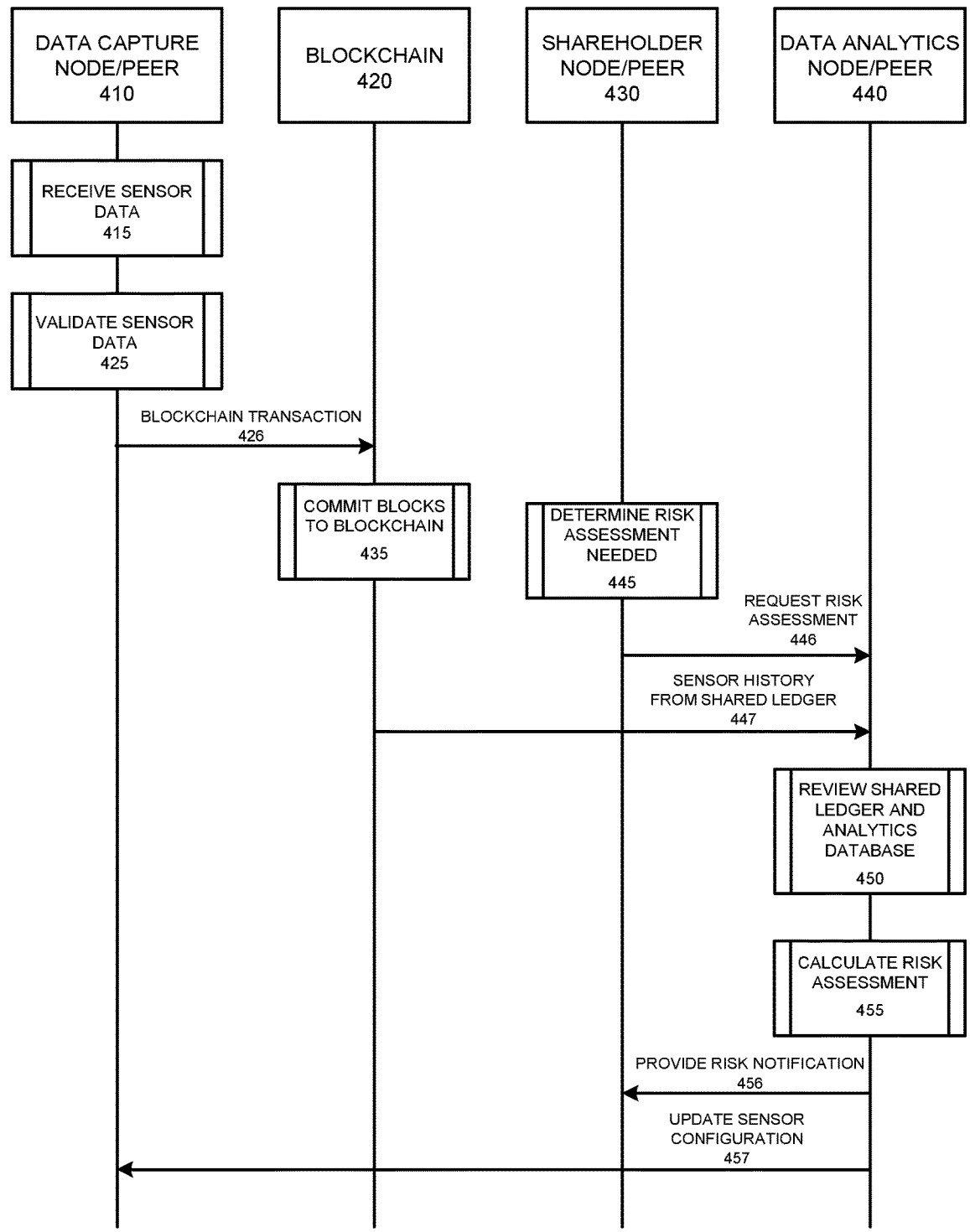
FIG. 4 illustrates a system messaging diagram for performing risk assessment in a building sensor blockchain network, according to example embodiments.

FIG. 4 illustrates a system messaging diagram for performing risk assessment in a building sensor blockchain network, according to example embodiments. Referring to FIG. 4, the system diagram 400 includes a data capture node or peer 410, a blockchain 420, a stakeholder node or peer 430, and a data analytics node or peer 440. The blockchain 420 represents the various portions of blockchain infrastructure involved with processing blockchain transactions and new blocks, including orderers, committers, etc.

At block 415, the data capture node or peer 410 receives sensor data 415 from one or more sensors 104 associated with a building. At block 425, the data capture node or peer 410 validates the received sensor data. After validating the sensor data, the data capture node or peer 410 generates a blockchain transaction 426 to the blockchain 420 containing the received sensor data.

The blockchain 420 creates a new block that includes blockchain transaction 426, and commits the new block to the blockchain 435. The blockchain 420 adds the new committed block 435 to the shared ledger 124 for the blockchain network. At this point, the received and validated sensor data 415, 425 is part of the blockchain history and may be accessed by appropriate blockchain nodes or peers in the future.

The stakeholder node or peer 430, which may be one of many stakeholder nodes or peers 430, determines a risk assessment may be required 445. The risk assessment may be requested for many reasons, including observations related to the building, costs, reliability of building systems, building personnel, environmental concerns, or many other factors. In one embodiment, the stakeholder node or peer 430 sends a message to the data analytics node or peer 440 containing the request for risk assessment. In another embodiment, the stakeholder node or peer 430 generates a blockchain transaction 426 to the blockchain network 100 requesting the risk assessment.

The data analytics node or peer 440, after receiving the request for risk assessment 446, obtains sensor history information from the shared ledger 447, and may also obtain various related information from an analytics database 136. The data analytics node or peer 440 reviews information from the shared ledger and analytics database 450, and based on those sources calculates the risk assessment 455. In one embodiment, the data analytics node or peer 440 provides a risk notification 456 as a message to the stakeholder node or peer 430 that created the request for risk assessment 446. In another embodiment, the data analytics node or peer 440 generates a blockchain transaction 426 to the blockchain network 100 including the risk assessment notification 456. In one embodiment, the data analytics node or peer 440 provides either a message or blockchain transaction 426 to the data capture node or peer 410 to update the sensor configuration 457. Updating the sensor configuration may include enabling/disabling one or more sensors, changing operating parameters of one or more sensors, updating or changing hardware/software/firmware associated with one or more sensors, resetting one or more sensors, or the like.

Figure 5A:
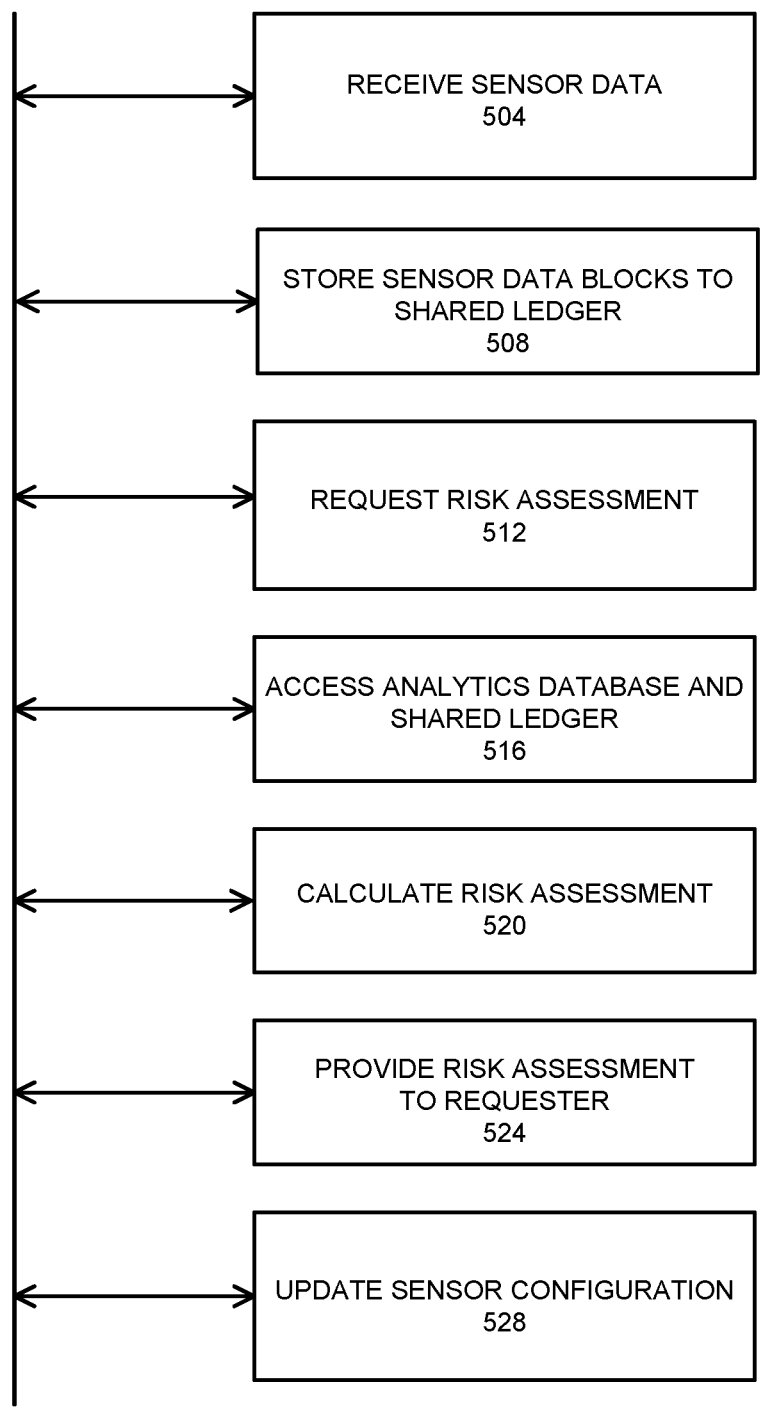
FIG. 5A illustrates a flow diagram of a blockchain network building sensor management process, according to example embodiments.

FIG. 5A illustrates a flow diagram of a blockchain network building sensor management process 500, according to example embodiments. Referring to FIG. 5A, the method 500 may include one or more of the following steps.

At block 504, a data capture/validating blockchain node or peer 108 receives new sensor data 140 from one or more sensors in a building 104. The data capture/validating blockchain node or peer 108 validates the sensor data 140 to make sure the data is suitable to include in new blocks of a blockchain network 100. After the sensor data 140 has been validated, the data capture/validating blockchain node or peer 108 creates a blockchain transaction containing the new sensor data 140.

At block 508, a committer blockchain node or peer 116 stores one or more new blocks including the new sensor data to a shared ledger 124 of the blockchain network 100. The new blocks add to history of the one or more sensors preserved in an immutable fashion for future reference.

At block 512, a blockchain node 120 requests a risk assessment related to one or more sensors of the building 104. In one embodiment, the requester is a stakeholder of the blockchain network 100, where a stakeholder includes a tenant, an owner, a landlord, a manager, a maintenance contractor, or a construction contractor. In another embodiment, the stakeholder is outside the blockchain network 100 and requests the risk assessment through a blockchain node or peer.

At block 516, a sensor analytics node or peer 132 accesses an analytics database 136 and/or the shared ledger 124 to obtain data to perform the risk assessment. The database 136 includes configuration, threshold, trends and other related information that may be searched by the sensor analytics node or peer 132. The shared ledger 124 includes blocks of committed transaction for all sensor history events and actions taken in response to sensor events.

At block 520, the sensor analytics node or peer 132 calculates the requested risk assessment based on data from the analytics database 136 and the shared ledger 124. In one embodiment, the risk assessment includes a probability of failure for one or more sensors 104. In another embodiment, the risk assessment identifies one or more safety issues associated with the building corresponding to the sensors 104. In one embodiment, the risk assessment identifies one or more maintenance issues associated with either one or more sensors 104 or the building.

At block 524, the sensor analytics node or peer 132 provides the risk assessment to the requester. In one embodiment, the risk assessment is provided as a blockchain transaction to a blockchain node. In one embodiment, the risk assessment is provided to a user device outside the blockchain network.

At block 528, the sensor configuration is updated. In one embodiment, a blockchain node associated with the one or more sensors 104 disables a sensor 104. In one embodiment, a blockchain node associated with one or more sensors 104 updates software or firmware associated with one or more sensors 104. In one embodiment, a blockchain node creates a blockchain transaction that includes an indication the one or more sensors 104 are to be disposed of based on a blockchain node executing a smart contract or chaincode.

In related embodiments, the disclosed system may involve and track both a) sensor data and issues (e.g., problems) and b) sensors themselves (the intended purpose of a sensor, software, hardware, etc.). Sensor issues may be represented by such properties as: a unique identifier, type, status, priority (low, medium, high), NEW (a possible problem was defined), CREATED (the problem was described and an overview was provided), REGISTERED (the problem was described in detail and classified), CLASSIFIED (all control data values of the problem data set were set), DIAGNOSED (a cause of a problem was defined and the known Error was defined), ERROR REGISTERED (all control data values of the known error data set were set), FOUND SOLUTION (one solution from a number of solution alternatives was chosen), RECOVERED (a solution for the problem was brought in), FAILED (the solution did not pass the PIR. In this activity, the success of an implemented problem is evaluated. This means a Post Implementation Review (PIR) is performed), SOLVED (the solution did pass the PIR), ABORTED (all analysis and problem solving was stopped. The problem data set did not pass the whole life cycle of the problem record), and END (the problem investigation and solution process were appraised finally).

Figure 5B:
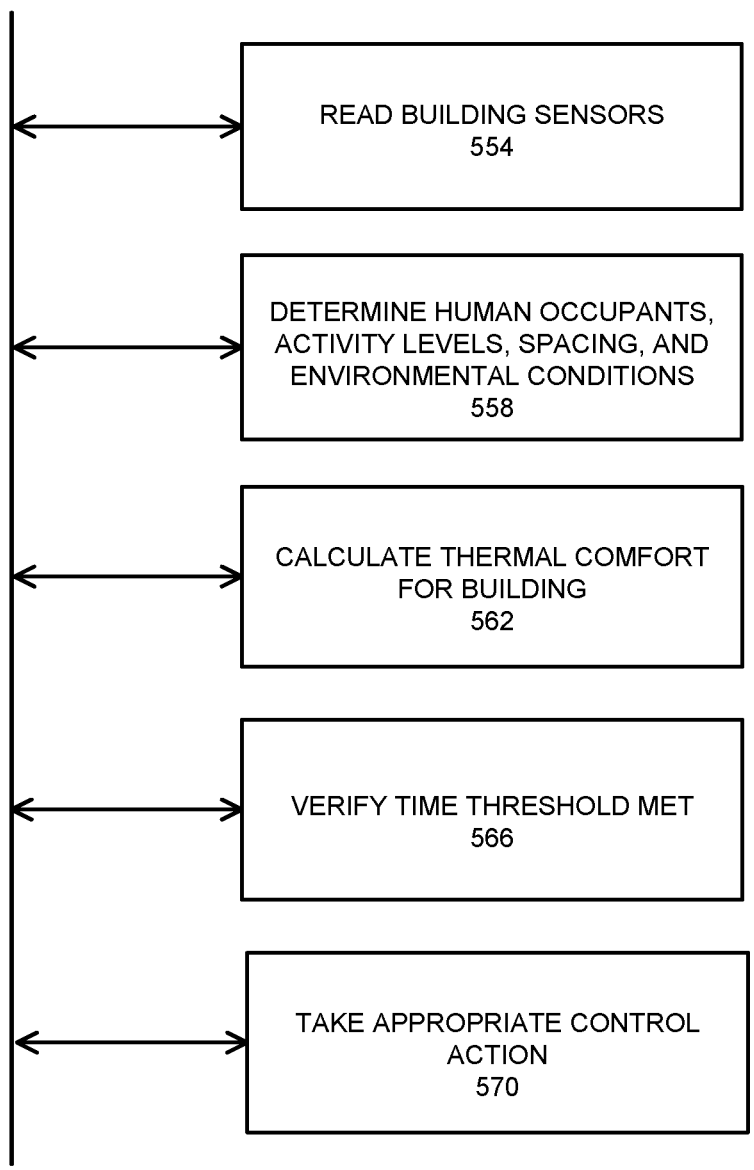
FIG. 5B illustrates a flow diagram of an example method of a building sensor control process, according to example embodiments.

FIG. 5B illustrates a flow diagram 550 of an example method of a building sensor control process, according to example embodiments. The method 550 may also include one or more of the following steps.

At block 554, various building sensors are read. In one embodiment, the building sensors include one or more motion sensors and one or more temperature sensors.

At block 558, the human occupants, activity levels, spacing, and environmental conditions are determined. A temperature control application may determine a number of human occupants within a building space based on data received from the one or more motion detectors. In different embodiments, the actual determination of the number of human occupants identified within the building space may be calculated by a processor associated with a motion detector and provided to a controller may calculate the number of humans in a building space using raw data from the motion detector.

A temperature control application may determine an activity level for each of the identified occupants of the building space. For example, the temperature control application may be implemented to assign an activity level as a number ranging from zero to three, based on the number of movements of the occupant identified by the motion detector over a given period of time. In some embodiments, the controller may calculate an activity level using measure of movement data received from the motion detector. However, it will be recognized that in other embodiments, the motion detector could be configured to determine the activity level of each occupant independently.

The temperature control application may determine the spacing between the occupants in the room. This analysis may be performed by a processor of the motion detector based on data from a depth sensor and a camera. Alternatively, this analysis may be performed in part by the controller based on spacing information received from the motion detector.

The temperature control application may also monitor field devices or several outputs thereof to determine environmental conditions within the room where the motion detector is located. These environmental conditions may include temperature as well as other environmental conditions such as humidity and lighting levels.

At block 562, thermal comfort for the building is calculated. The temperature control application may use the data concerning number of room occupants, activity level of the occupants, spacing of the occupants, temperature in the room, and other conditions in order to predict thermal comfort condition in the room. In one embodiment, the thermal comfort condition is predicted by calculating a Predictive Mean Value (PMV) number. PMV is an index that predicts the mean value of the votes of a large group of persons on a 7-point thermal sensation scale based on the heat balance of a human body. Factors that affect the PMV are metabolic rate, clothing insulation, air temperature, mean radiant temperature, air speed and relative humidity. A PMV equation provides a steady state model that can be calculated to provide a collective thermal comfort level for a particular building space. The PMV equation is a function of "thermal sensation" and "heat loss" of the occupants in the space. The calculated PMV number may be an integer ranging from −3 to 3, with −3 being a "cold" thermal comfort condition, and 3 being a "hot" thermal comfort condition.

At block 566, a time threshold is verified to have been met. The temperature control application may determine whether the calculated PMV has remained the same for some threshold time (e.g., 2 minutes). The threshold time prevents the temperature control system from changing the environmental conditions in the room based on temporary insignificant changes in the number of individuals in the room or the activity level in the room. For example, if a group of ten humans are gathered around a conference room table, and they decide to take a break, they may all stand and walk out of the room for a short period of time. During this time, there is no need for the temperature control system to change the room temperature based on a high level of activity, or the reduced number of persons in the room. Accordingly, the threshold time keeps the temperature control system from making excessive adjustments to temperature in the room. If the PMV has not remained constant for the threshold time, the temperature control application may continue processing by incrementing the timer. A small pause may also be added. The temperature control application then continues processing until the PMV for the room is calculated again.

At block 570, one or more appropriate control actions are taken. Once the PMV has remained constant for at least the threshold time, the controller determines whether the PMV value is zero. If the PMV value is zero, the thermal comfort condition is neutral, and no control actions need to be taken. On the other hand, if the PMV value is a non-zero number, the temperature control application may continue processing and determines an appropriate control action for the field devices of the temperature control system, based on the calculated PMV. If the PMV is zero, the temperature control application may continue in a steady state and control the field devices to maintain the current temperature in the room. However, if the PMV is a number other than zero, the temperature control application will control the field devices in an attempt to bring the PMV value back towards zero. After determining the appropriate control action, the controller continues processing and delivers the control signal to the appropriate field device. As an example of an appropriate control action that might be determined and delivered by the temperature control application, consider a temperature control system including damper actuators configured to control dampers that regulate air flow into a room. Also consider that it is a cold day in the winter season such that the heating unit of the HVAC system is turned on. If the PMV value is −3, such that the room is extremely cool to most occupants, the controller will attempt to make the room less cool. The controller may do this by confirming that the heating unit of the HVAC system is on and sending a control signal to a damper actuator in order to adjust the dampers to a fully open position (e.g., zero degrees), thus allowing heated air to flow into the room at a maximum rate. Similarly, if the PMV value is −2, such that the room is moderately cool to most occupants, the controller may confirm that the heating unit of the HVAC system is on and send a control signal to a damper actuator in order to adjust the damper to a mostly open position (e.g., thirty degrees). If the PMV value is −I, such that the room is only slightly cool to most occupants, the controller may confirm that the heating unit of the HVAC system is on and send a control signal to a damper actuator in order to adjust the damper to a partially open position (e.g., sixty degrees). In each case, the temperature control application determines control actions intended to make the room less cool in an attempt to return the thermal comfort condition in the room to a neutral condition (e.g., PMV=O).

Figure 6A:
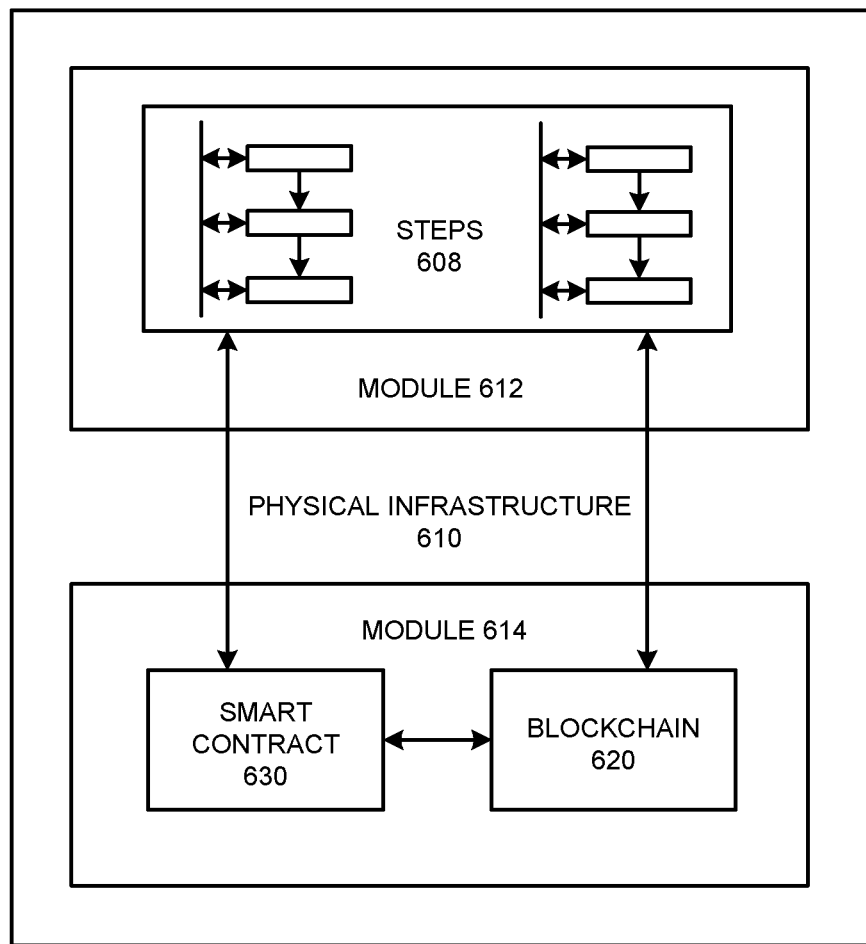
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
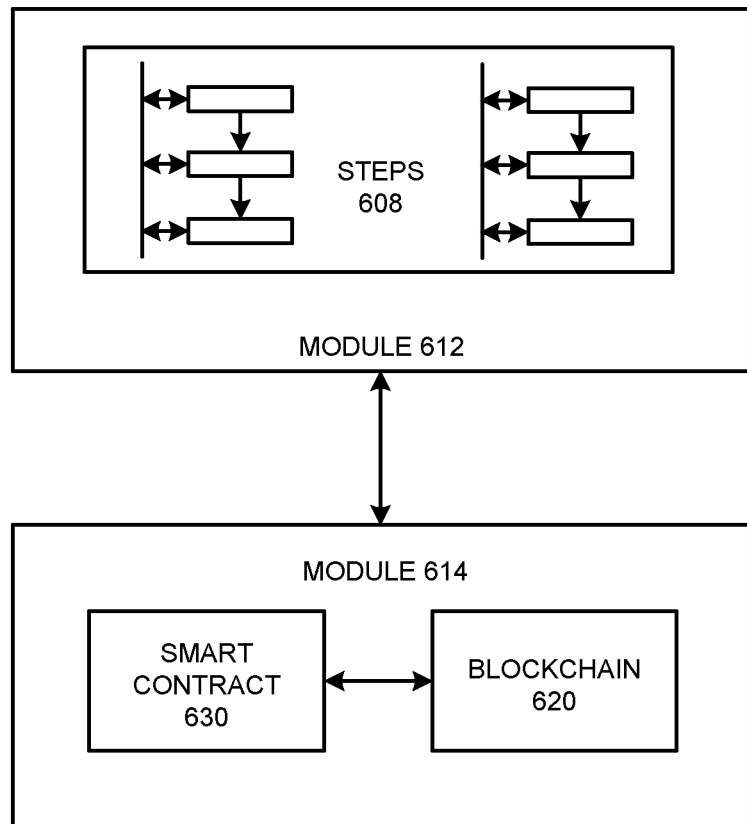
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
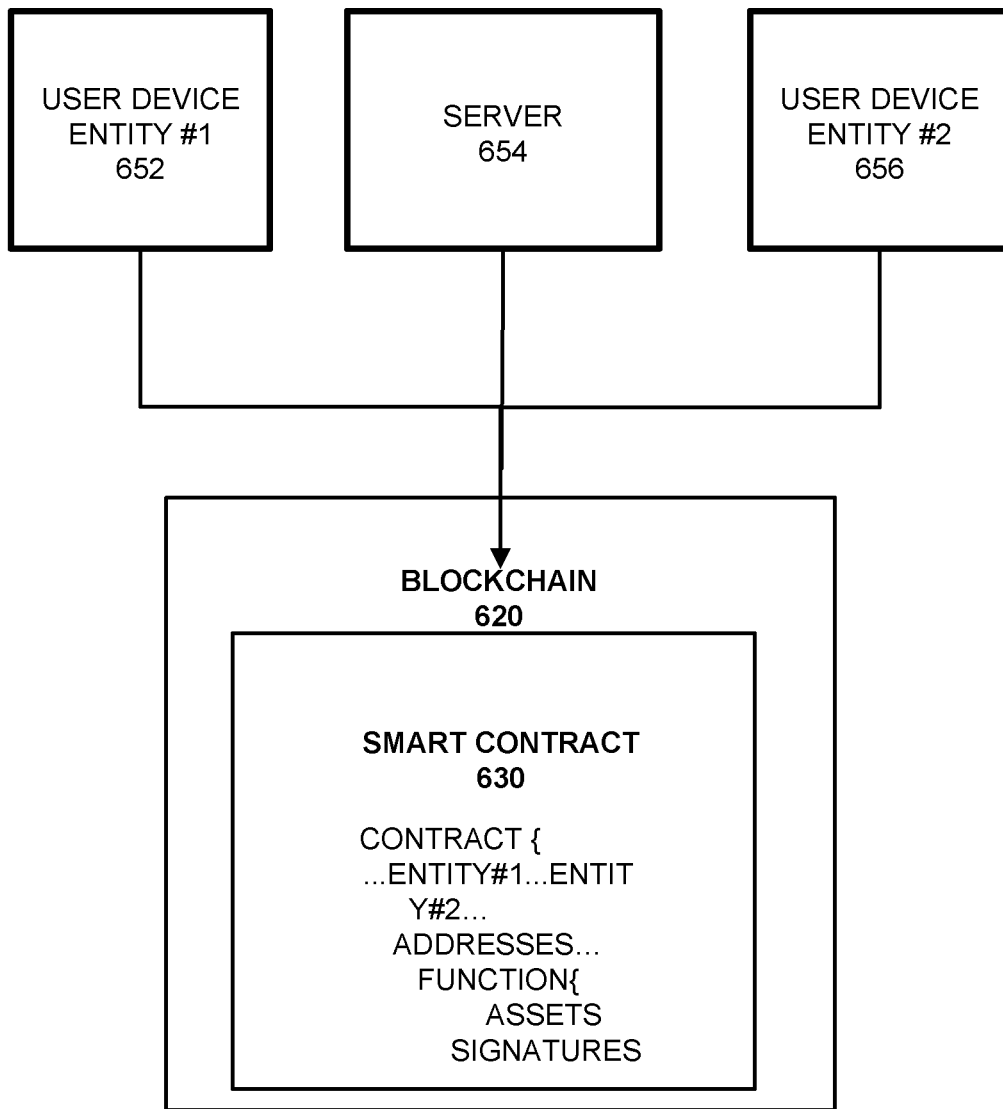
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
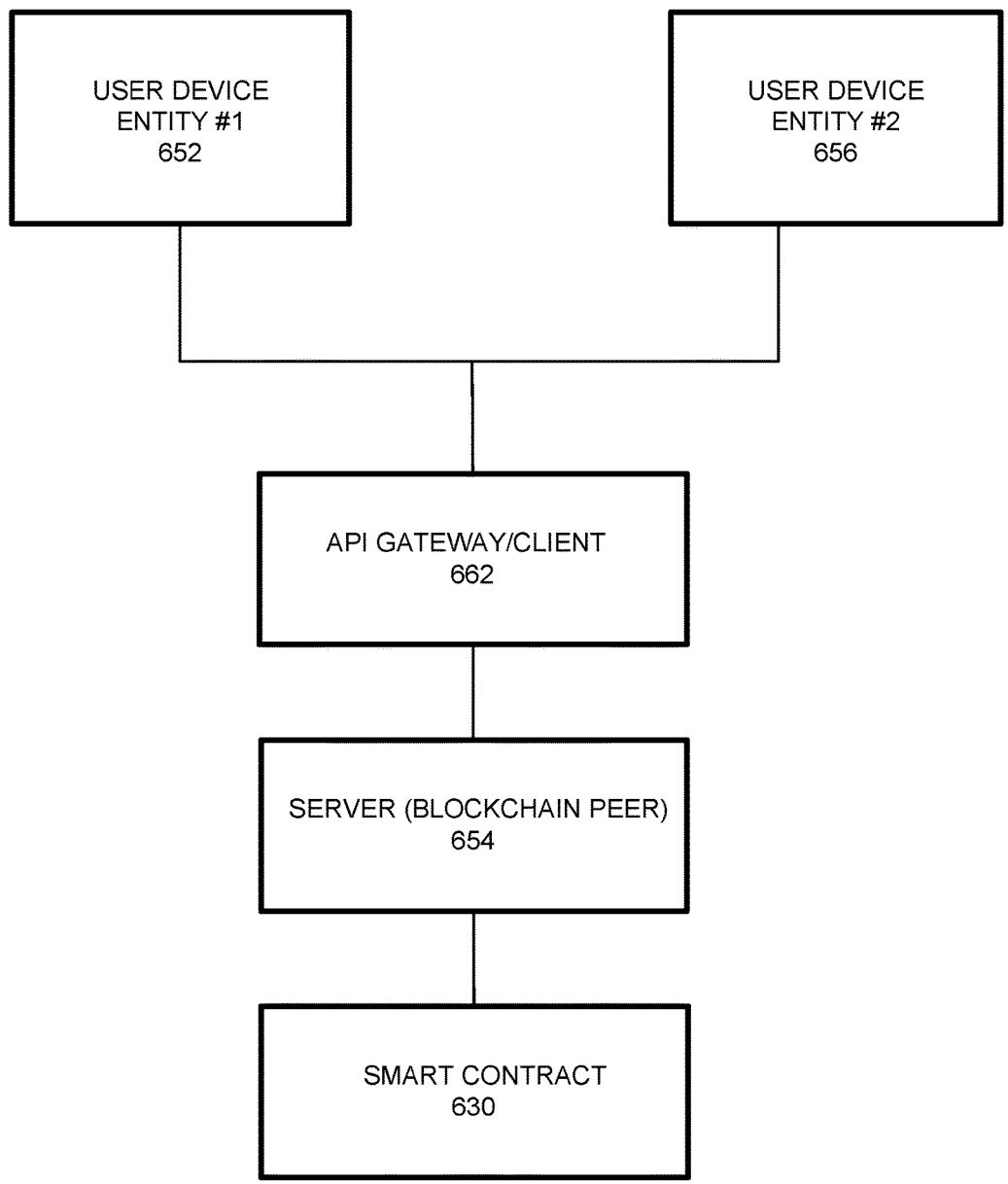
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (e.g., invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
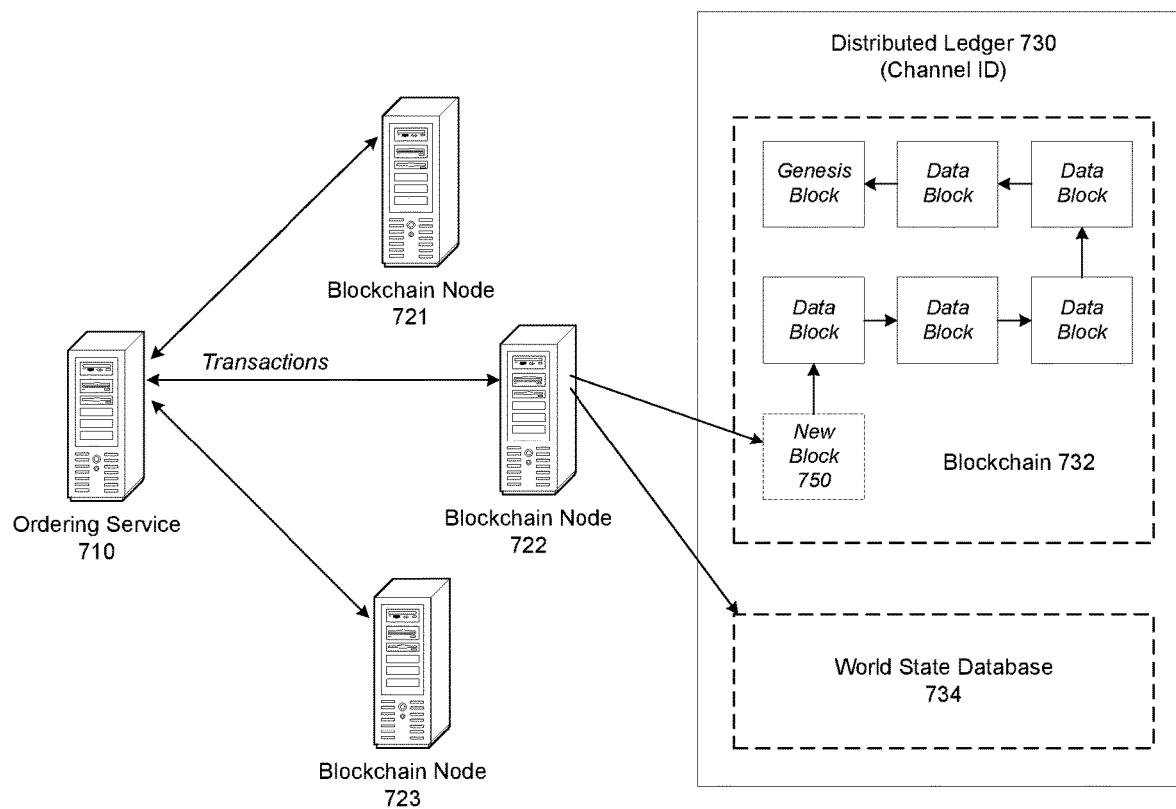
FIG. 7A illustrates a process of new data being added to a database, according to example embodiments.
Figure 7B:
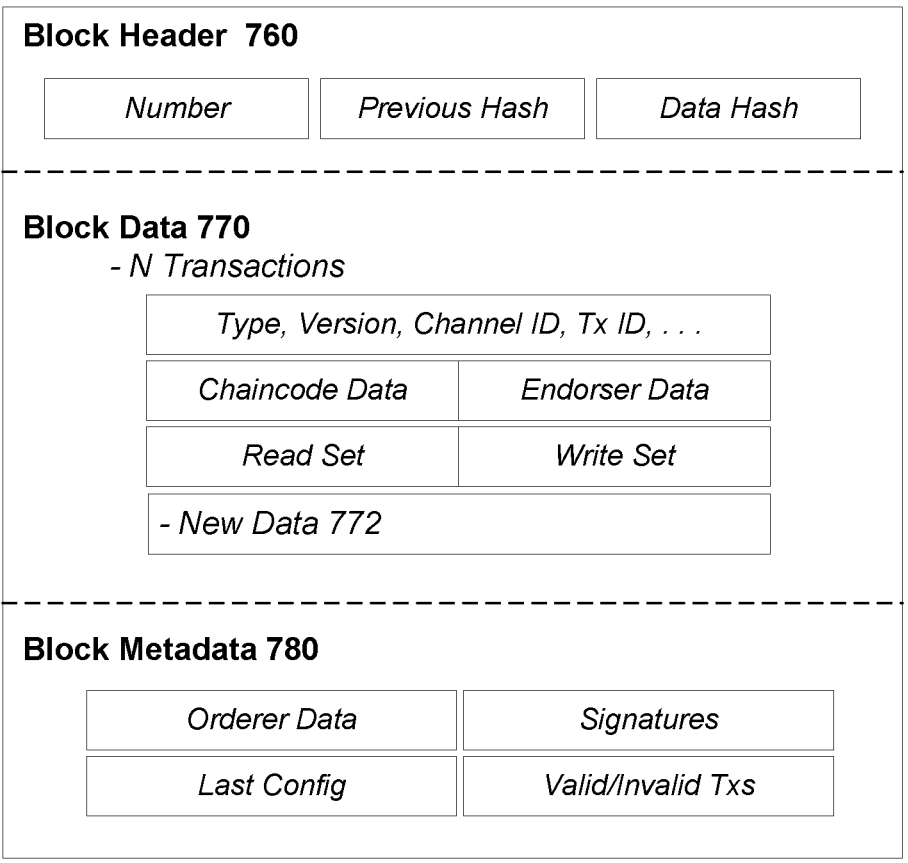
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732; it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes create a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, sensor data 140, a response to sensor data, a sensor adjustment 172, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
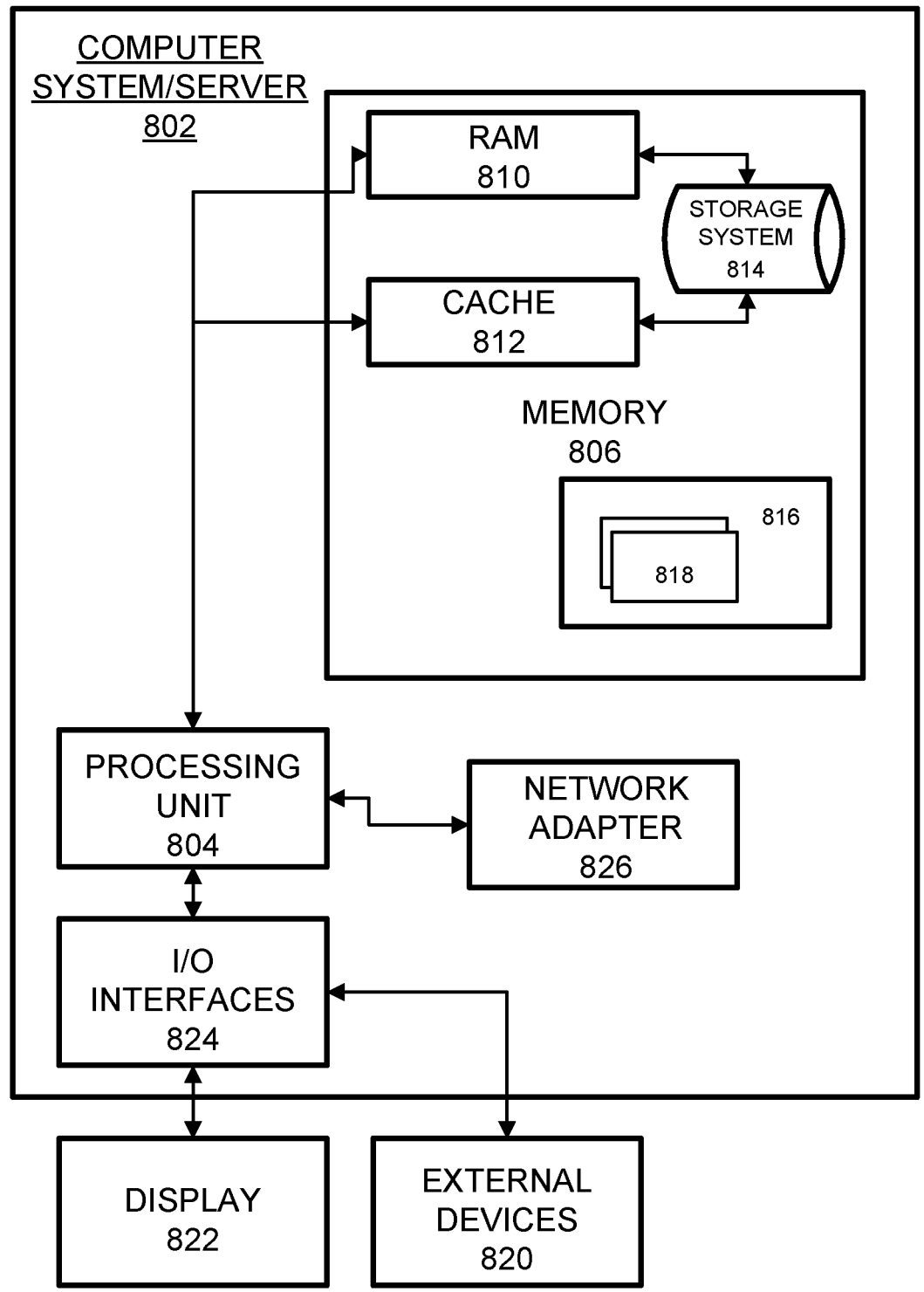
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable media having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:
    a memory configured to store instructions; and
    a processor that, when executing the instructions, is configured to:
        in response to a request from a peer to generate a risk assessment, retrieve current sensor data from a most recently stored block of a blockchain ledger, and historical sensor data from a previously stored block of the blockchain ledger, where the current sensor data indicates a current condition detected by a first type of sensor of a building and the historical sensor data indicates a previous condition detected by the sensor of the building,
        generate a risk assessment of the current condition based on an analysis of the historical sensor data;
        identify the condition as a risk to the building based on the risk assessment,
        receive a communication from an occupant of the building reporting the condition,
        identify an emotional state of the occupant based on analysis of the communication,
        identify a level of the risk to be high based on the emotional state,
        in response to the identification that the level of the risk is high, activate a second type of sensor that is different than the first type of sensor to generate a new type of sensor data that is different than the current sensor data,
        add the new type of sensor data to blocks of the blockchain, and
        send a notification of the risk to the peer.

2. The system of claim 1, wherein the current condition is a maintenance issue.

3. The system of claim 1, wherein the processor is further configured to:
    stop an operation of the sensor, and
    request an update for the sensor.

4. The system of claim 1, wherein the peer comprises at least one of:
    a tenant, an owner, a landlord, a manager, a maintenance contractor, and a construction contractor.

5. The system of claim 1, wherein, when the processor generates the risk assessment, the processor is further configured to:

generate a multidimensional vector comprising values for multiple dimensions of risk.

6. The system of claim 1, wherein, when the processor generates the risk assessment, the processor is further configured to:
generate the risk assessment, including a value representing a degree of concern with the current condition.

7. The system of claim 1, wherein the current condition indicates a problem with the sensor, and
wherein the processor is further configured to:
update the sensor to correct the problem.

8. A method comprising:
in response to a request to generate a risk assessment from a peer of a blockchain network, retrieving, by a node, current sensor data from a most recently stored block of a blockchain ledger of the blockchain network, and retrieving historical sensor data from a previously stored block of the blockchain ledger, where the current sensor data indicates a current condition detected by a first type of sensor of a building and the historical sensor data indicates a previous condition detected by the sensor of the building;
generating, by the node, a risk assessment of the current condition based on an analysis of the historical sensor data;
identifying, by the node, the condition as a risk to the building based on the risk assessment;
receiving, by the node, a communication from an occupant of the building reporting the condition,
identifying, by the node, an emotional state of the occupant based on analysis of the communication,
identifying, by the node, a level of the risk to be high based on the emotional state,
in response to the identifying that the level of the risk is high, activating, by the node, a second type of sensor that is different than the first type of sensor to generate a new type of sensor data that is different than the current sensor data,
adding, by the node, the new type of sensor data to blocks of the blockchain based on the identification of the emotional state; and
sending, by the node, a notification of the risk to the peer.

9. The method of claim 8, wherein the current condition indicates a problem with the sensor.

10. The method of claim 8, wherein the method further comprises:
stopping an operation of the sensor; and
requesting an update for the sensor.

11. The method of claim 8, wherein the peer comprises at least one of:
a tenant, an owner, a landlord, a manager, a maintenance contractor, and a construction contractor.

12. The method of claim 8, wherein the generating the risk assessment further comprises:
generating a multidimensional vector comprising values for multiple dimensions of risk.

13. The method of claim 8, wherein the generating a risk assessment further comprises:
generating the risk assessment, including a value representing a degree of concern with the current condition.

14. The method of claim 8, wherein the current condition indicates a problem with the sensor, and
wherein the method further comprises:
updating the sensor to correct the problem generating a value representing a concern with a use of the building.

15. A computer program product comprising a non-transitory computer-readable storage medium storing instructions that, when executed by a processor of a node in a blockchain network, cause the processor to perform:
in response to a request to generate a risk assessment from a peer of the blockchain network, retrieving current sensor data from a most recently stored block of a blockchain ledger of the blockchain network, and retrieving historical sensor data from a previously stored block of the blockchain ledger, where the current sensor data indicates a current condition detected by a first type of sensor of a building and the historical sensor data indicates a previous condition detected by the sensor of the building;
generating a risk assessment of the current condition based on an analysis of the historical sensor data;
identifying the condition as a risk to the building based on the risk assessment;
receiving a communication from an occupant of the building reporting the condition,
identifying an emotional state of the occupant based on analysis of the communication,
identifying a level of the risk to be high based on the emotional state,
in response to the identifying that the level of the risk is high, activating a second type of sensor that is different than the first type of sensor to generate a new type of sensor data that is different than the current sensor data,
adding the new type of sensor data to blocks of the blockchain based on the identification of the emotional state; and
sending a notification of the risk to the peer.

16. The computer program product of claim 15, wherein the current condition is a maintenance issue.

17. The computer program product of claim 15, wherein the peer comprises at least one of:
a tenant, an owner, a landlord, a manager, a maintenance contractor, and a construction contractor.

18. The computer program product of claim 15, wherein the generating the risk assessment further comprises:
generating a multidimensional vector comprising values for multiple dimensions of risk.

19. The computer program product of claim 15, wherein the generating the risk assessment further comprises:
generating the risk assessment, including a value representing a degree of concern with the current condition.

20. The computer program product of claim 15, wherein the current condition indicates a problem with the sensor, and
wherein the instructions further cause the processor to perform:
updating the sensor to correct the problem generating a value representing a concern with a use of the building.

* * * * *